United States Patent
Clark et al.

(10) Patent No.: US 7,284,605 B2
(45) Date of Patent: Oct. 23, 2007

(54) APPARATUS AND METHODS FOR REDUCING STAND-OFF EFFECTS OF A DOWNHOLE TOOL

(75) Inventors: Brian Clark, Sugar Land, TX (US); Jan W. Smits, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 274 days.

(21) Appl. No.: 10/711,598

(22) Filed: Sep. 28, 2004

(65) Prior Publication Data

US 2006/0065394 A1    Mar. 30, 2006

(51) Int. Cl.
*E21B 47/00* (2006.01)
(52) U.S. Cl. ..................... 166/254.2; 166/66
(58) Field of Classification Search .............. 166/66, 166/254.2, 250.01, 254.1, 250.02, 250.05, 166/381
See application file for complete search history.

(56) References Cited

U.S. PATENT DOCUMENTS

| | | | |
|---|---|---|---|
| 3,662,172 A | 5/1972 | Youmans | |
| 3,944,910 A | 3/1976 | Rau | |
| 4,048,495 A * | 9/1977 | Ellis | .......... 250/264 |
| 4,052,662 A | 10/1977 | Rau | |
| 4,063,151 A | 12/1977 | Suau et al. | |
| 4,077,003 A | 2/1978 | Rau | |
| 4,151,457 A | 4/1979 | Rau | |
| 4,327,290 A | 4/1982 | Plasek | |
| 4,578,580 A | 3/1986 | Smith, Jr. | |
| 4,638,161 A | 1/1987 | Smith, Jr. et al. | |
| 4,652,829 A | 3/1987 | Safinya | |
| 4,689,572 A | 8/1987 | Clark | |
| 4,704,581 A | 11/1987 | Clark | |
| 4,814,609 A | 3/1989 | Wraight et al. | |
| 4,845,359 A | 7/1989 | Wraight | |
| 4,879,463 A | 11/1989 | Wraight et al. | |
| 5,017,778 A * | 5/1991 | Wraight | ....... 250/254 |
| 5,210,495 A | 5/1993 | Hapashy et al. | |
| 5,243,290 A | 9/1993 | Safinya et al. | |
| 5,250,806 A | 10/1993 | Rhein-Knudsen | |
| 5,345,179 A | 9/1994 | Habashy et al. | |
| 5,406,206 A | 4/1995 | Safinya et al. | |
| 5,434,507 A | 7/1995 | Beren et al. | |
| 5,451,779 A * | 9/1995 | Spross et al. | ....... 250/266 |
| 5,452,772 A * | 9/1995 | Van Den Bergh | ....... 175/74 |
| 5,473,158 A | 12/1995 | Holenka et al. | |

(Continued)

*Primary Examiner*—David Bagnell
*Assistant Examiner*—David Andrews
(74) *Attorney, Agent, or Firm*—Bryan L. White; Kevin P. McEnaney; Brigitte L. Echols (57) ABSTRACT

A method for reducing stand-off effects of a downhole tool includes disposing the downhole tool in a borehole, wherein the downhole tool comprises at least one moveable section disposed between an energy source and a receiver on the downhole tool; and activating the at least one moveable section to reduce a thickness of at least one selected from a mud layer and a mudcake between the downhole tool and a wall of the borehole. A downhole tool includes an energy source and a receiver disposed on the downhole tool; at least one moveable section disposed between the energy source and the receiver; and an activation mechanism for reducing a thickness of at least one selected from a mud layer and a mudcake between the downhole tool and a wall of a borehole.

11 Claims, 5 Drawing Sheets

U.S. PATENT DOCUMENTS

| | | |
|---|---|---|
| 5,513,528 A | 5/1996 | Holenka et al. |
| 5,574,371 A | 11/1996 | Tabanou et al. |
| 6,173,793 B1 | 1/2001 | Thompson et al. |
| 6,179,066 B1 * | 1/2001 | Nasr et al. .................... 175/45 |
| 6,191,588 B1 | 2/2001 | Chen |
| 6,648,083 B2 | 11/2003 | Evans et al. |

* cited by examiner

APPARATUS AND METHODS FOR REDUCING STAND-OFF EFFECTS OF A DOWNHOLE TOOL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

1. Field of the Invention

The invention relates generally to tools for well logging. More particularly, the invention relates to devices and methods for reducing stand-off effects in downhole tools.

2. Background Art

Oil and gas industry uses various tools to probe the formation to locate hydrocarbon reservoirs and to determine the types and quantities of hydrocarbons. A typical logging tool transmits energy (a signal) from a source (e.g., a transmitter of a propagation tool or a gamma-ray source of a density logging tool) into the borehole and the formation. The transmitted signal interacts with matters in the formation when it traverses the formation. As a result of these interactions, the properties of the transmitted signal is altered, and some of the altered signals may return to the borehole and the tool. One or more sensors (e.g., receivers) may be disposed on the tool to detect the returned signals. The detected signals can then be analyzed to provide insights into the formation properties.

Ideally, the receivers detect only the signals returned from the formation. However, if the transmitters and the receivers do not directly contact the formation (i.e., tool stand-off), the borehole and the borehole fluid often provide an alternate transmission pathway for the signals to travel from the transmitters to the receivers. Signal transmitted in the borehole may be generally referred to as "trapped signals," which complicate the measurements and may render the analysis of the desired signals difficult or impossible.

Various approaches are known in the art for reducing or eliminating tool stand-off effects (or borehole effects). The following description uses electromagnetic propagation tools as examples to illustrate the problems associated with tool stand-off effects and to illustrate methods for overcoming these effects. One of ordinary skill in the art would appreciate that embodiments of the invention may be used with various tools and are not limited to these specific examples.

Figure 1A:
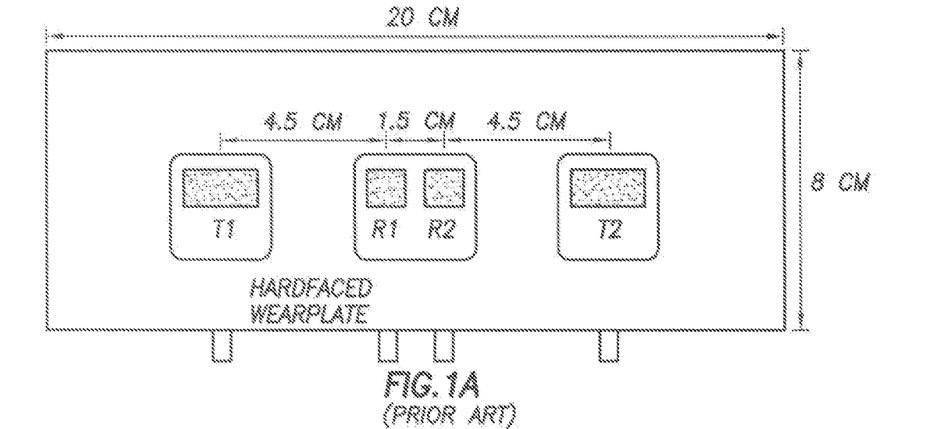
FIG. 1A shows a top view of a prior art electromagnetic dipole arrays disposed on a articulating pad.
Figure 1B:
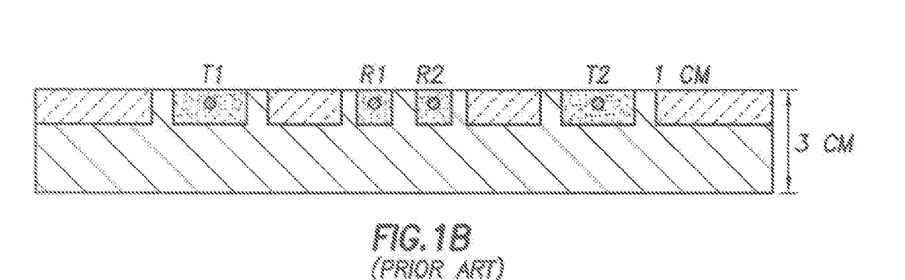
FIG. 1B shows a side view of the articulating pad of FIG. 1A.
Figure 1C:
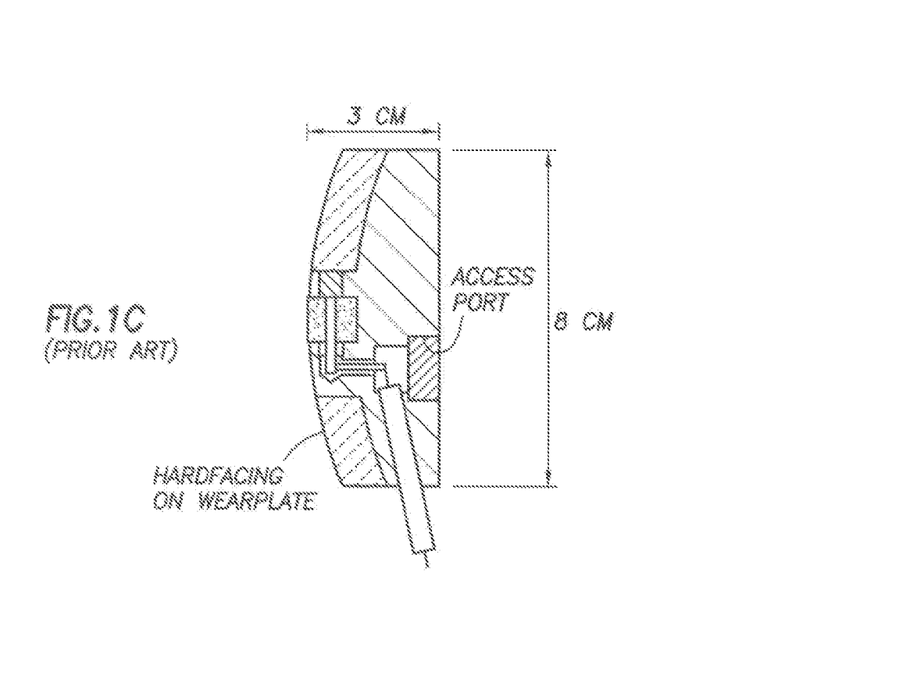
FIG. 1C shows a cross sectional view of the articulating pad of FIG. 1A.

Electromagnetic (EM) propagation tools are commonly used to measure the subsurface properties of resistivity and/or dielectric constant. For discussion of EM propagation measurements see: "Theory of Microwave Dielectric Logging Using the Electromagnetic Wave Propagation Method," Freeman et al., Geophysics, 1979; U.S. Pat. Nos. 4,689,572 and 4,704,581 issued to Clark. EM propagation can also be used to provide borehole imaging while drilling. The boreholes may be drilled with an oil-based mud (OBM) or an water-based mud (WBM). In a typical EM propagation tool, the antennas are mounted on one or more articulated pads. FIGS. 1A-1C show a schematic of a typical EM tool having antennas or magnetic dipole arrays mounted on a pad. FIG. 1A shows a top view of the pad, which typically has dimensions of 20 cm by 8 cm and a thickness of 3 cm. As shown in FIG. 1A, two transmitters T1 and T2 are each disposed on one side of the two receivers R1 and R2 at equal spacings. The two transmitters T1 and T2 can be sequentially fired to provide compensated measurements, as disclosed in U.S. Pat. No. 3,849,721 issued to Calvert. FIG. 1B shows a side view of the pad, while FIG. 1C shows a cross sectional view of the pad, illustrating the curved pad face that is designed to fit the borehole wall. The curvatures of the pads may be designed to fit a particular borehole diameter (e.g., 6, 8½, or 12½ inches). FIG. 1C also shows that the pad face may be coated with a hardfacing material to make the pad more wear resistant.

The antennas (as shown in FIG. 1A) may be endfire and/or broadside magnetic dipole arrays, which may be operated at a proper frequency (e.g., approximately 1 GHZ for propagation measurements). Other electromagnetic sensors have been proposed for high frequency measurements, for example, using button electrodes that function as normal electric dipoles (being normal to the pad face), crossed magnetic dipoles, and normal magnetic dipoles.

Because stand-off between the sensors and the formation can lead to erroneous measurements, especially in oil based mud, the pads that house the sensors should be articulated to maintain contact with the formation at all times. Ideally, the distance between the pad face and the borehole wall should be 0.1 inches or less.

With the antennas mounted in the articulated pad, cables would need to be routed to the pad (see FIG. 1C). In some tools, it may be necessary to place some front-end electronics in the pad to reduce the number of cables and/or to improve the measurement accuracy. Because the pads are subject to higher shock levels than the drill collars, pad-mounted electronics will have to be designed to survive in harsher environments.

An extremely harsh environment may be encountered by the antennas and electronics mounted in the pad and the cables connecting the pad to the drill collar. For example, if the drill collar is rotating at 120 RPM in an 8.5 inch borehole, then the articulated pad will travel 16,000 ft/hr just from the tool's rotation. In a 100 hour Logging While Drilling (LWD) job, the pad will travel 1,600,000 ft. To put this in perspective, a typical wireline tool travels only a few thousand feet in a logging job. Therefore, the mechanical abuse on an LWD pad in one LWD job is roughly three orders of magnitude greater than on a wireline pad in a wireline job. Hence, abrasion of the antennas could be a significant problem leading to antenna failure and high maintenance and service costs. The minimum reliability for an LWD tool should be 2000 hr, which implies that the pad-mounted antennas need to survive 32,000,000 ft before failures occur.

Mechanical shock for components mounted in an articulated pad is another serious concern. Assuming 120 RPM and one shock per revolution, the pad will experience 7,200 shocks/hr. In a 100 hr job, the pad would experience 720,000 shocks. To achieve an MTBF (Mean Time Between Failure) of 2000 hr, the components would then have to survive 144,000,000 shocks. These numbers arc well above the number of shocks currently experienced by Measurement While Drilling (MWT) or LWD components which are not mounted in an articulated pad. Furthermore, since the is small, lightweight, and articulated, the shock level will be considerably higher in the pad than in die drill collar. Developing antennas and electronics to survive these shock levels is challenging.

Frictional contact between the pad and the formation may also result in the pad being subjected to much higher temperatures than the ambient downhole temperature. Another concern is the repeated stress applied to the cables between the pad and the drill collar. Again assuming 120 RPM, the cables will be twisted 14,400 times per hr (opening and closing the pad every revolution) and 1,440,000 times in a 100 hr LWD job.

The above description shows that while mounting the sensors on articulate pads can overcome most of the adverse effects associated with tool stand-offs, this approach subjects the sensors and the electronics to harsher environments. An alternative is to mount the sensors in non-moving parts of a drill string assembly. For example, U.S. Pat. No. 6,173,793 B1 issued to Thompson et al. discloses tools having sensors mounted in non-rotating pads. While this approach overcomes some problems associated with rotating pads, it is sometimes desirable to have sensors rotate with the drill strings, for example to provide full-bore images. Therefore, there still exists a need for methods that can provide similar benefits of articulating pads without subjecting the sensors to the extremely harsh environment experienced by a typical articulating pad.

SUMMARY OF INVENTION

One aspect of the invention relates to methods for reducing stand-off effects of a downhole tool. A method in accordance with one embodiment of the invention includes disposing the downhole tool in a borehole, wherein the downhole tool comprises at least one moveable section disposed between an energy source and a receiver on the downhole tool; and activating the at least one moveable section to reduce a thickness of a mud layer and/or mudcake between the downhole tool and a wall of the borehole. Here, mud refers to the specialized drilling fluid used to lubricate the drill string, used to lift rock cuttings to surface, and used to prevent blowouts. Mudcake refers to a generally soft and thin layer that forms on the surface of the borehole in permeable rock formations. As the boundary between the mud and mudcake can be indistinguishable, hereafter the mud layer and any mudcake will simply be referred to as the "mud layer."

One aspect of the invention relates to downhole tools. A downhole tool in accordance with one embodiment of the invention includes an energy source and a receiver disposed on the downhole tool; at least one moveable section disposed between the energy source and the receiver; and an activation mechanism for reducing a thickness of a mud layer between the downhole tool and a wall of a borehole.

Other aspects and advantages of the invention will be apparent from the following description and the appended claims.

DETAILED DESCRIPTION

Embodiments of the invention relate to methods for reducing stand-off effects without mounting sensors (e.g., antennas) on articulated pads. In accordance with embodiments of the invention, the sensors or antennas (e.g., transmitters and receivers) may be mounted on the drill collars or stabilizers of a tool, and one or more articulating (deployable) pads are placed between the energy source (e.g., transmitters) and detectors (e.g., receivers). These pads may be articulated to eliminate or minimize the mud layer between the pads and the formation, and, therefore, to eliminate or minimize the transmission of the trapped signals. Embodiments of the invention is based on the concept of divorcing the sensors (e.g., antennas) from the articulated pad, while retaining the advantages of articulation.

Embodiments of the invention may be applied to any sensor or tool that is adversely impacted by trapped signals traveling in a mud layer between a source and a receiver. Such sensors or tools may include, for example, EM propagation tools and electrode tools. For example, embodiments of the invention can also be applied to nuclear measurements such as formation density measurements, in which gamma-rays are emitted from a radioactive source (e.g. $^{137}Cs$) and detected by a scintillation counter disposed at a distance from the source.

Figure 2:
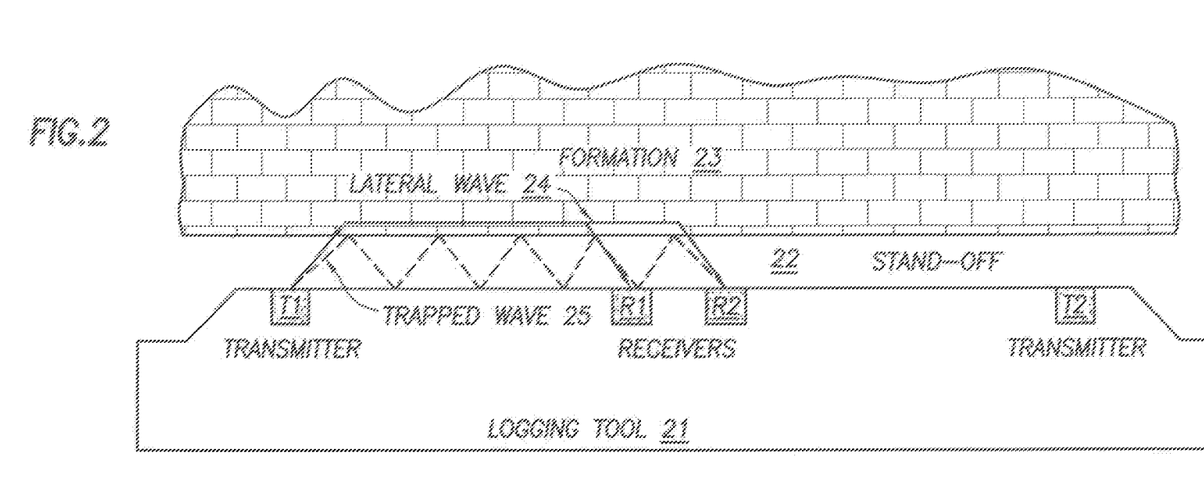
FIG. 2 shows energy transmission pathways via the formation and the borehole of a conventional electromagnetic logging tool disposed in a borehole.

To illustrate the working principles of embodiments of the invention, FIG. 2 shows an EM propagation tool 21 having two transmitters T1, T2 and two receivers R1, R2 (similar to that shown in FIG. 1). The transmitters T1, T2 and receivers R1, R2 could be broadside, endfire, crossed, or normal magnetic dipole arrays, or normal electric dipoles. The tool 21 in FIG. 2 is a borehole compensated system, in which two transmitters T1, T2 are each disposed on one side of the two receivers R1, R2 at equal distances. The two transmitters T1, T2 may be sequentially fired to provide two sets of measurements (attenuation and phase shift between the receivers R1, R2) that may be used to cancel most of the differences in the sensitivities of the two receiving antennas.

As shown in FIG. 2, when transmitter T1 is activated, it may excite two distinct propagating waves 24,25 that reach the receivers R1,R2. The "lateral wave" 24 can be viewed as traveling through the formation 23 to reach the receivers R1,R2, while the "trapped wave" 25 can be viewed as traveling in the mud layer 22 between the tool face 26 and the formation 23. If it were possible to measure only the lateral wave 24, then the phase shift ($\phi$) and attenuation (A) measured between the two receivers R1,R2 would accurately describe the formation properties. However, the receivers R1,R2 would detect both the lateral 24 and trapped waves 25, and, therefore, the measurements obtained in a typical logging operation can be significantly influenced by the trapped waves 25.

The trapped wave's characteristics are largely affected by the mud layer's properties. The stronger the trapped wave, the more difficult it is to determine the formation properties. In general, the trapped wave has a greater impact on the measurements of a propagation tool when: (1) the stand-off occurs in very resistive mud (e.g., oil-based mud), (2) the formation is very conductive compared to the mud, and (3) and the stand-off is significant (e.g., greater than approximately 0.1 to 0.2 inches).

In the prior art, the impact of trapped waves is typically minimized by mounting sensors in articulated pads, which, when deployed, eliminate or reduce stand-offs in front of the sensors. By eliminating or reducing the stand off, the source on the articulated pad injects energy directly into the formation, minimizing the generation of the trapped waves. However, this approach subjects the sensors and their associated electronics and the cables to stress and wear.

Embodiments of the invention use an alternative approach that divorces the sensors from the articulating pads. Instead, embodiments of the invention use moveable sections between the transmitters (or other energy sources) and receivers to fill the gap between the tool surface and the formation, as shown in FIG. 3.

Figure 3:
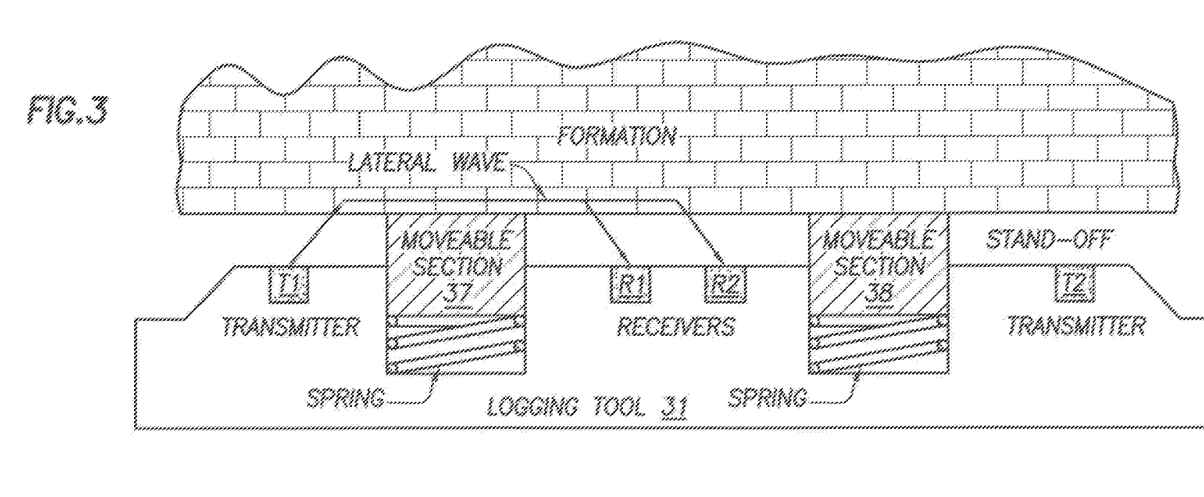
FIG. 3 shows energy transmission pathway via the formation of an electromagnetic logging tool disposed in a borehole in accordance with one embodiment of the invention.

FIG. 3 shows a logging tool 31, in accordance with one embodiment of the invention, having two transmitters T1,T2 and two receivers R1,R2 disposed on the non-moveable parts (e.g., collar or stabilizers) of the tool, instead of articulating pads (see FIG. 1). As shown in FIG. 3, two moveable (deployable) sections 37,38 are disposed between the transmitters T1,T2 and receivers R1,R2. When deployed, these moveable sections 37,38 essentially cut off the pathways that may conduct the trapped waves (shown as 25 in FIG. 2). The moveable sections 37,38 are preferably made of wear resistant materials (e.g., metal) and may be further protected with a hardfacing coating (e.g., PDC coating or cubic boron nitride coating).

In the tool shown in FIG. 3, the transmitters T1,T2 and receivers R1,R2 themselves are rigidly mounted on non-moveable sections on the tool 31 (e.g., the drill collar or stabilizer). Therefore, the transmitters T1,T2 and the receivers R1,R2 would not experience the same level of environmental shocks, mechanical flexing, and abrasion as they would, if mounted on an articulated pad. In addition, the electronics (not shown) are located inside the drill collar, and the antennas may be connected to the electronics without exposing wires (not shown) to borehole pressure and mud.

The moveable sections 37,38 may be simple metallic parts (e.g. steel with hardfacing or TCI inserts), which can be replaced as wear items. This can significantly reduce the costs associated with the maintenance and services of the tools. The moveable sections 37,38 may be activated by any mechanism known in the art, e.g., springs or hydraulic pressure differential between the inside and outside of the drill collar.

The stand-off with an LWD tool that has sensors mounted on a stabilizer typically is relatively small (e.g., about ½ inch or 1.3 cm), and, therefore, moveable sections do not have to travel a great distance. For example, in some embodiments, the transmitters and receivers may be mounted on an upset on the drill collar OD, or in a stabilizer blade. As the drill collar rotates, the distance between the antennas and the formation will vary from zero stand-off (e.g., when the antennas are on the low side of a deviated borehole) to a maximum stand-off (approximately 2 inch, when they are on the high side of the borehole). Hence, in most cases, the moveable sections need only be able to move in and out a fraction of an inch (2.5 cm).

Figure 4:
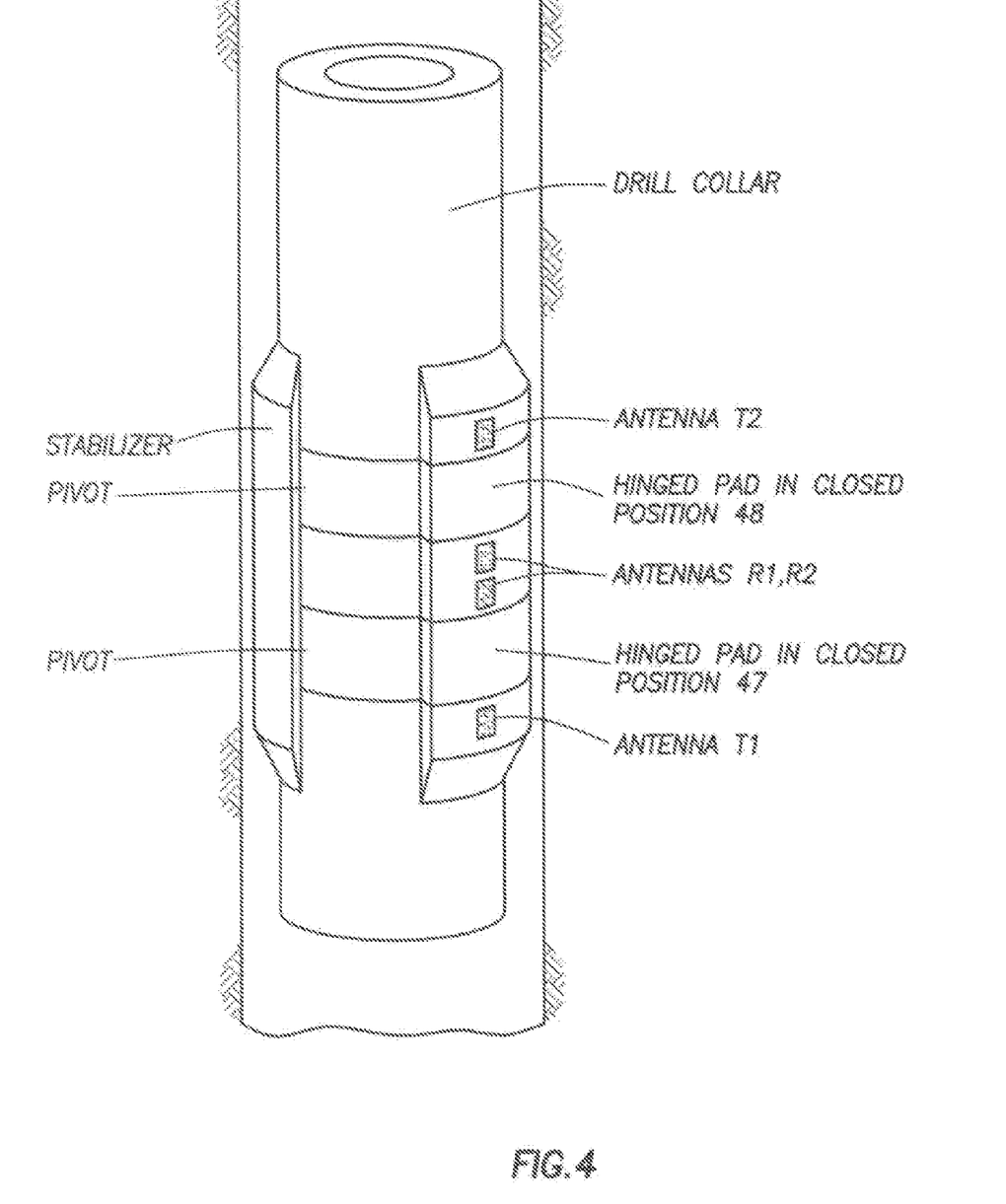
FIG. 4 shows a logging tool having moveable sections in a closed position in accordance with one embodiment of the invention.
Figure 5:
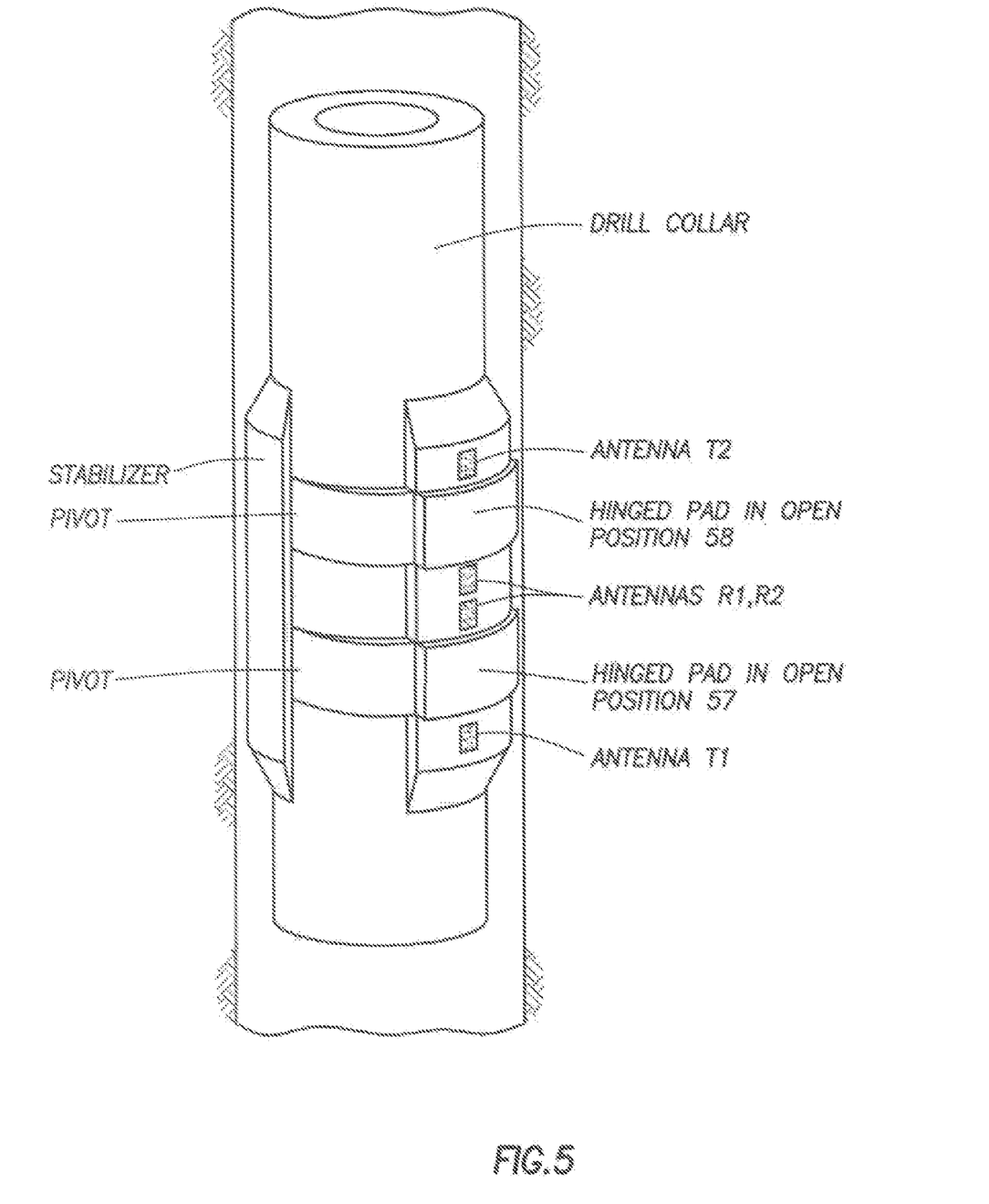
FIG. 5 shows a logging tool having moveable sections in an open (deployed) position in accordance with one embodiment of the invention.

The moveable sections may use any mechanism known in the art for attachment and deployment, including hinges and springs, hydraulics, etc. For example, in FIG. 3, springs 39 are used to articulate (deploy) the moveable sections 37,38. Furthermore, FIG. 4 and FIG. 5 show examples, in which hinges are used to attach and control the movement of moveable sections. The hinge option may be similar to those used in the PowerDrive™ pads from Schlumberger Technology Corp. (Houston, Tex.). FIG. 4 shows the moveable sections 47,48 in the closed position, while FIG. 5 shows the moveable sections 57,58 in the open position. These figures illustrate that the antennas T1,T2 and R1,R2 are rigidly mounted on stabilizer blades, while the moveable sections are attached to the drill collar with hinges. The hinges are attached in a manner such that the hinge is the leading edge during normal rotation. These moveable sections may be activated (deployed) by a pressure differential across the inside and outside of the drill collar when the mud pumps are on, and when the mud pumps are off, these sections may be retracted by bias springs. In this case, the default position of the moveable sections is the closed position. In alternative embodiments, these moveable sections (pads) may be constructed to have a slight bias pressure (e.g., using springs) to have them in the activated (deployed) state by default, and the extent of the movement (extension) is limited by the borehole diameter when they are in the borehole.

Some embodiments of the invention may use other mechanical options to open and close the moveable sections. For example, radial expansion may use spring or hydraulics activation. In these embodiments, bolts or lips may be used to prevent the sections from becoming detached from the drill collar. One of ordinary skill in the art would appreciate that other variations are possible without departing from the scope of the invention.

The above description uses an electromagnetic logging tool to illustrate embodiments of the invention. As noted above, embodiments of the invention may be used in other situations where signal propagation in the borehole produces undesirable effects. These situations include many other formation logging tools, such as the gamma-ray density logging tools. For a description of gamma-ray density logging tools see U.S. Pat. No. 3,263,083 issued to Johnson et al., U.S. Pat. No. 3,858,037 issued to Moore et al., and U.S. Pat. No. 3,864,569 issued to Tittman.

Figure 6:
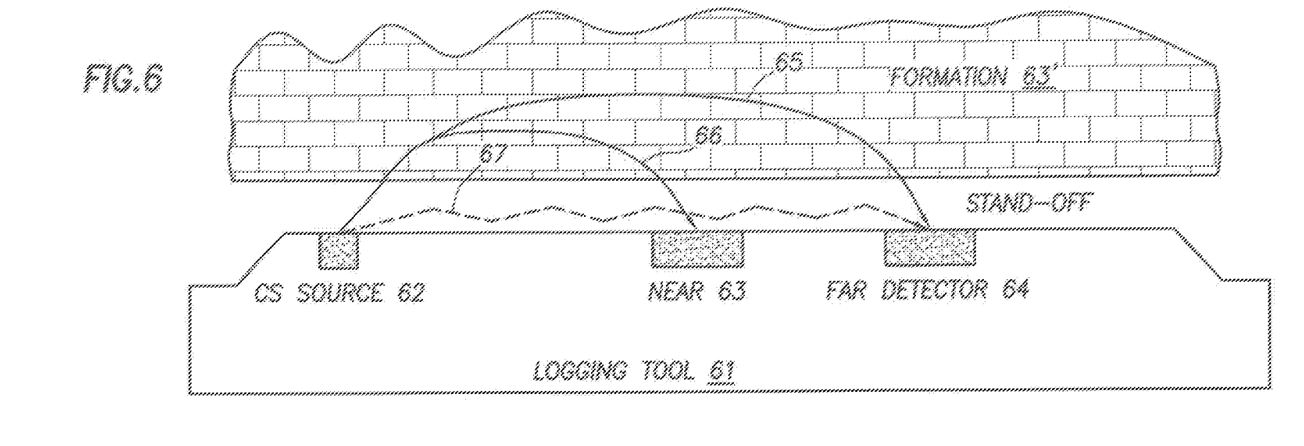
FIG. 6 shows energy transmission pathways via the formation and the borehole of a conventional gamma-ray density logging tool disposed in a borehole.

FIG. 6 shows an embodiment of the invention used in a gamma-ray density logging tool 61 that uses a radioactive source 62 (e.g. $^{137}$Cs) to provide a stream of gamma-rays. These gamma-rays are ultimately detected by "near" 63 and "far" 64 detectors, as indicated by the solid lines, curve 65,66, in FIG. 6. The detectors 63,64 are typically sodium-iodine crystals with photomultipliers. Gamma-rays enter the formation and are Compton scattered and attenuated by electrons. The greater the electron density is, the more scattering and attenuation occur. The electron density is related to the formation's mass density, with typical formation mass densities being 2 to 3 gm/cc. On the other hand, drilling mud has a mass density typically 1 to 2 gm/cc, and, therefore, it does not attenuate gamma-rays as efficiently. If stand-off occurs, then gamma-rays can stream through the mud layer and reach the detectors with little attenuation. The dashed lines, curve 67, in FIG. 6 illustrate gamma-rays traveling through the mud layer. The gamma rays traveling in the mud layer can seriously degrade the formation density measurements.

Therefore, in the prior art wireline density logging tools, the density measurement source and/or detectors are typically disposed on articulated pads to ensure good contact with the borehole wall, and to minimize any stand-off effects. However, an articulated pad containing a radioactive source and detectors would be extremely difficult to build and possibly quite dangerous for LWD. The possibility of losing a radioactive source downhole precludes mounting it on an articulated pad, which can be destroyed or become detached from the drill collar. Also, the radioactive source and the detectors are quite large and would be difficult to fit into a typical articulated pad. Thus, existing LWD density tools typically place the source and detectors inside the drill collar or inside a fixed stabilizer blade. As the LWD density tool rotates, the stand-off between the tool and borehole wall varies from zero to about ½ inch or more, depending on the stabilizer OD and the borehole diameter. If the stand-off is greater than about ¾ inch, the density measurements may be very seriously impaired. For example, density images covering the entire borehole would not be possible with large stand-offs on the top of the hole.

Figure 7:
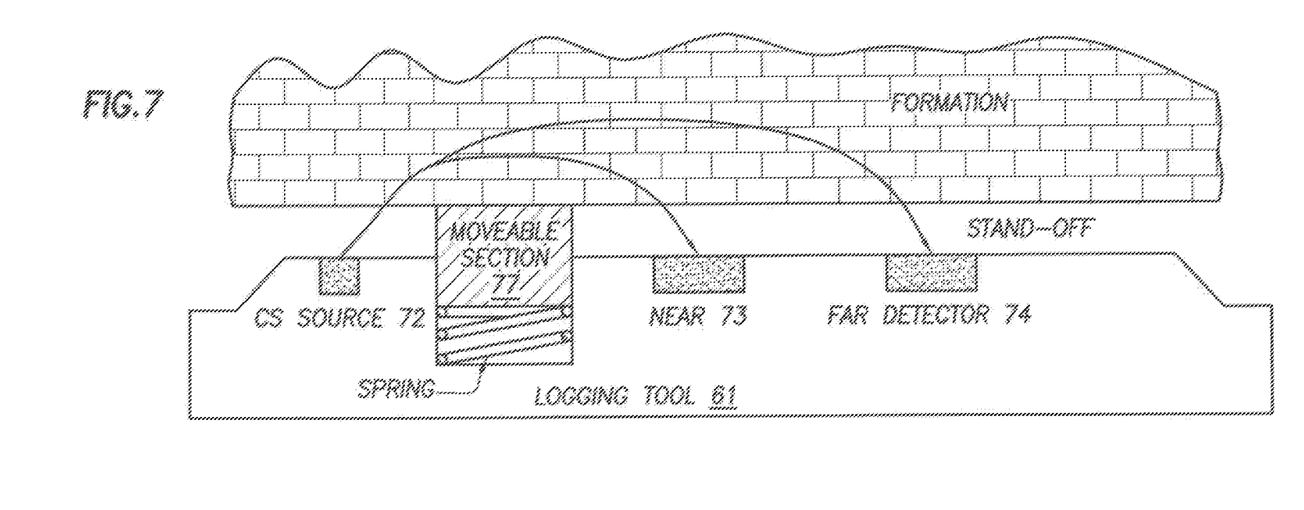
FIG. 7 shows energy transmission pathway via the formation of a gamma-ray density logging tool disposed in a borehole in accordance with one embodiment of the invention.

Adding a moveable section to the density measurement can block the gamma-rays traveling in the stand-off region. This is illustrated in FIG. 7. The moveable section 77 shown in FIG. 7 is preferably made of a high-density material, such as steel, which has a density of 7.8 gm/cc. This will fully attenuate any gamma-rays traveling through the mud layer. The radioactive source 72 and gamma-ray detectors 73,74 can remain mounted in the drill collar or under a fixed stabilizer blade as before. The moveable sections 77 may be attached and deployed using any mechanism described above. For example, a hinged system as described in FIGS. 4 and 5 may be used. Because there is only one source 72, a moveable section disposed between the source 72 and the detectors 73,74 will be sufficient.

The above description uses an EM tool and a density logging tool to illustrate embodiments of the invention. However, embodiments of the invention are not so limited and can be applied to any tool that suffers from adverse effects arising from trapped signals traveling in the borehole. Furthermore, embodiments of the invention may be used on wireline, logging-while-drilling (LWD), measurement-while-drilling (MWD), or measurement-while-tripping (MWT) tools. One of ordinary skill in the art would appreciate that embodiments of the invention benefits from having moveable sections disposed between energy sources and receivers on the tool. However, embodiments of the invention do not exclude tools that also have the sensors disposed on articulating pads. Therefore, these tools are within the scope of the invention.

Advantages of the invention may include one or more of the following. Embodiments of the invention are based on a concept that divorces the sensors from the articulating pads, while retaining the benefits of an articulating pads. The sensors are disposed on fixed parts of the tool, while one or more articulating pads or sections are disposed between the energy source and the receivers to prevent or reduce the trapped signal transmission in the mud layer. The sensors of these embodiments are not subjected to the same extent of mechanical adverse impacts as compared to those disposed on articulating pads. The moveable sections of embodiments of the invention can effectively reduce or prevent signals from traveling in the borehole. These moveable sections are relatively inexpensive to manufacture and to replace. Therefore, the overall costs of the manufacturing and maintenance of the tools can be significantly reduced. Embodiments of the invention have broad applicability and can be used on a wide range of downhole tools.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for reducing stand-off effects of a downhole tool, comprising:
   disposing the downhole tool in a borehole, wherein the downhole tool comprises at least one moveable section disposed between and moveable relative to an energy source and a receiver on the downhole tool; and
   activating the at least one moveable section to move outwardly from the tool to fill the gap between the tool and a wall of the borehole and to reduce a thickness of at least one selected from a mud layer and a mudcake between the downhole tool and the wall of the borehole.

2. The method of claim 1, wherein the downhole tool is one selected from a wireline tool, a logging-while-drilling tool, a measurement-while-drilling tool, and measurement-while-tripping tool.

3. The method of claim 1, wherein the downhole tool is an electromagnetic logging tool or a gamma-ray density tool.

4. The method of claim 1, wherein the activating is by a mechanical mechanism or a hydraulic mechanism.

5. The method of claim 1, wherein the at least one moveable section is attached to the downhole tool by a hinge.

6. A downhole tool, comprising:
   an energy source and a receiver disposed on the downhole tool;
   at least one moveable section disposed between and moveable relative to the energy source and the receiver, the moveable section being moveable outwardly from the tool; and
   an activation mechanism for deploying the moveable section to move outwardly to fill the gap between the tool and a wall of the borehole and reducing a thickness of at least one selected from a mud layer and a mudcake between the downhole tool and the wall of the borehole.

7. The downhole tool of claim 6, wherein the downhole tool is one selected from a wireline tool, a logging-while-drilling tool, a measurement-while-drilling tool, and a measurement-while-tripping tool.

8. The downhole tool of claim 6, wherein the downhole tool is an electromagnetic logging tool or a gamma-ray density tool.

9. The downhole tool of claim 6, wherein the activation mechanism is a mechanical mechanism or a hydraulic mechanism.

10. The downhole tool of claim 6, wherein the at least one moveable section is attached to the downhole tool by a hinge.

11. The downhole tool of claim 6, wherein the energy source and the receiver are disposed on a non-moveable part on the downhole tool.

* * * * *